US010787553B2

(12) United States Patent
Michie, Jr. et al.

(10) Patent No.: US 10,787,553 B2
(45) Date of Patent: Sep. 29, 2020

(54) POLYETHYLENE COMPOSITION AND ARTICLES MADE THEREFROM

(71) Applicants: Dow Global Technologies LLC, Midland, MI (US); William J. Michie, Jr., Missouri City, TX (US); Dale A. Wright, Charleston, WV (US); Robert J. Jorgensen, Scott Depot, WV (US); Carl F. Baker, Lake Jackson, TX (US); Burkhard E. Wagner, Highland Park, NJ (US); Joe B. Garrett, Jr., St. Albans, WV (US); Matthew H. Mills, Wayne, WV (US)

(72) Inventors: William J. Michie, Jr., Missouri City, TX (US); Dale A. Wright, Charleston, WV (US); Robert J. Jorgensen, Scott Depot, WV (US); Carl F. Baker, Lake Jackson, TX (US); Burkhard E. Wagner, Highland Park, NJ (US); Joe B. Garrett, Jr., St. Albans, WV (US); Matthew H. Mills, Wayne, WV (US)

(73) Assignee: Dow Global Technologies LLC, Midland, MI (US)

( * ) Notice: Subject to any disclaimer, the term of this patent is extended or adjusted under 35 U.S.C. 154(b) by 1520 days.

(21) Appl. No.: 14/363,092

(22) PCT Filed: Nov. 28, 2012

(86) PCT No.: PCT/US2012/066736
§ 371 (c)(1),
(2) Date: Jun. 5, 2014

(87) PCT Pub. No.: WO2013/095877
PCT Pub. Date: Jun. 27, 2013

(65) Prior Publication Data

US 2015/0099077 A1 Apr. 9, 2015

Related U.S. Application Data

(60) Provisional application No. 61/577,451, filed on Dec. 19, 2011.

(51) Int. Cl.

| | |
|---|---|
| ***C08F 210/16*** | (2006.01) |
| ***C08J 9/16*** | (2006.01) |
| ***C08F 110/02*** | (2006.01) |
| ***C08F 10/02*** | (2006.01) |

(52) U.S. Cl.
CPC ................ *C08J 9/16* (2013.01); *C08F 10/02* (2013.01); *C08F 110/02* (2013.01); *Y10T 428/1372* (2015.01); *Y10T 428/2982* (2015.01)

(58) Field of Classification Search
CPC .... C08F 10/00; C08F 4/24; C08F 4/69; C08F 210/16; Y10T 428/139
USPC .................... 428/34.7, 35.1, 35.7; 526/348.5
See application file for complete search history.

(56) References Cited

U.S. PATENT DOCUMENTS

| | | | | |
|---|---|---|---|---|
| 2,825,721 | A | 3/1958 | Hogan et al. | |
| 3,622,251 | A | 11/1971 | Allen | |
| 4,101,722 | A | 7/1978 | Hogan et al. | |
| 4,289,863 | A | 9/1981 | Hill et al. | |
| 7,829,646 | B2 * | 11/2010 | DesLauriers | C08F 10/00 428/36.9 |
| 2008/0177013 | A1 | 7/2008 | Schneider et al. | |
| 2011/0009577 | A1 | 1/2011 | Jorgensen | |

FOREIGN PATENT DOCUMENTS

| | | | |
|---|---|---|---|
| WO | 99/09075 | | 2/1999 |
| WO | 02/088196 | | 11/2002 |
| WO | 2004/094489 | | 11/2004 |
| WO | WO2010063443 | * | 6/2010 |

OTHER PUBLICATIONS

Chinese Response to Office Action dated May 1, 2016; from Chinese counterpart Application No. 201280069653.4.
Response to EPO Communication Rule 161(1) and 162 dated Jul. 25, 2014 filed Jan. 30, 2015 for counterpart European Application No. 12799677.5, 9 pages.
PCT International Search Report and Written Opinion dated Mar. 8, 2013, 14 pages.
PCT International Preliminary Report on Patentability dated Jun. 24, 2014, 8 pages.
EPO Associate letter dated Jul. 30, 2014 and EPO Office Action dated Jul. 25, 2014 for counterpart EPO Application No. 12799677. 5, 11 pages.
Chinese Office Action dated Dec. 17, 2015; from Chinese counterpart Application No. 201280069653.4.

* cited by examiner

*Primary Examiner* — Ellen S Hock
(74) *Attorney, Agent, or Firm* — Dinsmore & Shohl LLP

(57) ABSTRACT

A polyethylene composition comprising a granular polyethylene resin characterized by a resin solid density of from 0.91 to 0.97 g/cm$^3$, a ratio of intraparticle void volume to interparticle void volume of from 0.33 to 0.67, and a total resin porosity, Φtotal, of equal to or greater than 0.45 is provided. Further provided are articles made from the polyethylene composition.

14 Claims, No Drawings

POLYETHYLENE COMPOSITION AND ARTICLES MADE THEREFROM

FIELD OF INVENTION

The instant invention relates to a polyethylene composition and articles made therefrom.

BACKGROUND OF THE INVENTION

Certain end use applications of polyethylene resins require a high degree of polymer unsaturation for the post reactor processing, such as crosslinking reactions, to take place efficiently. In addition, some such end use applications further require specific void volumes, or resin porosity, to further facilitate post reactor processes.

The present invention provides polyethylene compositions which may be used, at least, in such end use applications.

SUMMARY OF THE INVENTION

The instant invention is a polyethylene composition and articles made therefrom.

In one embodiment, the instant invention provides a polyethylene composition comprising: a granular polyethylene resin characterized by a resin solid density of from 0.91 to 0.97 g/cm$^3$, a ratio of intraparticle porosity to interparticle porosity of from 0.33 to 0.67, and a total resin porosity, $\Phi_{total}$, of equal to or greater than 0.45.

In an alternative embodiment, the instant invention further provides an article comprising one or more embodiments of the inventive polyethylene composition.

DETAILED DESCRIPTION OF THE INVENTION

The instant invention is a polyethylene composition and articles made therefrom.

The composition according to the present invention comprises: a granular polyethylene resin characterized by a resin solid density of from 0.91 to 0.97 g/cm$^3$, a ratio of intraparticle porosity to interparticle porosity of from 0.33 to 0.67, and a total resin porosity, $\Phi_{total}$, of equal to or greater than 0.45.

The granular polyethylene resins useful in the invention are characterized by a resin solid density of from 0.91 to 0.97 g/cm$^3$. All individual values and subranges from 0.91 to 0.97 g/cm$^3$ are included herein and disclosed herein; for example, the resin solid density can be from a lower limit of 0.91, 0.92, 0.93, 0.94, 0.95 or 0.96 g/cm$^3$ to an upper limit of 0.92, 0.93, 0.94, 0.95 or 0.96, or 0.97 g/cm$^3$. For example, the resin solid density may be in the range of from 0.91 to 0.97 g/cm$^3$, or in the alternative, the resin solid density may be in the range of from 0.935 to 0.96 g/cm$^3$, or in the alternative, the resin solid density may be in the range of from 0.95 to 0.96 g/cm$^3$, or in the alternative, the resin solid density may be in the range of from 0.955 to 0.96 g/cm$^3$.

The granular polyethylene resins useful in the invention are characterized by a ratio of intraparticle porosity to interparticle porosity, ($\Phi_{intraparticle}/\Phi_{interparticle}$), of from 0.33 to 0.67. All individual values and subranges from 0.33 to 0.67 are included herein and disclosed herein; for example, the ratio of intraparticle porosity to interparticle porosity can be from a lower limit of 0.33, 0.45, 0.52, or 0.65 to an upper limit of 0.4, 0.56, 0.62 or 0.67. For example, the ratio of intraparticle porosity to interparticle porosity may be in the range of from 0.33 to 0.67, or in the alternative, the ratio of intraparticle porosity to interparticle porosity may be in the range of from 0.4 to 0.6, or in the alternative, the ratio of intraparticle porosity to interparticle porosity may be in the range of from 0.45 to 0.58.

The granular polyethylene resins useful in the invention are characterized by a total resin porosity, $\Phi_{total}$, of equal to or greater than 0.45. All individual values and subranges from equal to or greater than 0.45 are included herein and disclosed herein; for example, the total resin porosity can be from a lower limit of 0.45, 0.5 or 0.55.

In some embodiments, the granular polyethylene resin is further characterized by a resin solid density of from 0.955 to 0.96 g/cm$^3$ and a granular resin settled bulk density ($SBD_{PE}$) of from 435 to 495 kg/m$^3$.

All individual values and subranges from 0.955 to 0.96 g/cm$^3$ are included herein and disclosed herein; for example, the resin solid density can be from a lower limit of 0.955, 0.956, 0.957, 0.958, or 0.959 g/cm$^3$ to an upper limit of 0.956, 0.957, 0.958, 0.959, or 0.96 g/cm$^3$. For example, the resin solid density may be in the range of from 0.955 to 0.96 g/cm$^3$, or in the alternative, the resin solid density may be in the range of from 0.956 to 0.959 g/cm$^3$, or in the alternative, the resin solid density may be in the range of from 0.957 to 0.96 g/cm$^3$.

All individual values and subranges from 435 kg/m$^3$ to 495 kg/m$^3$ are included herein and disclosed herein; for example, the $SBD_{PE}$ can be from a lower limit of 435, 445, 455, 465, 475, or 485 kg/m$^3$ to an upper limit of 445, 455, 465, 475, 485, or 495 kg/m$^3$. For example, the $SBD_{PE}$ may be in the range of from 435 kg/m$^3$ to 495 kg/m$^3$, or in the alternative, the $SBD_{PE}$ may be in the range of from 445 kg/m$^3$ to 475 kg/m$^3$, or in the alternative, the $SBD_{PE}$ may be in the range of from 435 kg/m$^3$ to 475 kg/m$^3$, or in the alternative, the $SBD_{PE}$ may be in the range of from 455 kg/m$^3$ to 495 kg/m$^3$.

In some embodiments, the granular polyethylene resin is a high molecular weight resin characterized by a melt index, $I_{21}$, of from 2 to 4 dg/min and a melt index ratio, $I_{21}/I_5$, of from 20 to 40.

All individual values and subranges from 2 to 4 dg/min are included herein and disclosed herein; for example, the $I_{21}$ can be from a lower limit of 2, 2.4, 2.8, 3, 3.2, 3.6 or 3.8 dg/min to an upper limit of 2.2, 2.4, 2.8, 3, 3.2, 3.6, 3.8, or 4 dg/min. For example, the granular polyethylene resin $I_{21}$ may be in the range of from 2 to 4 dg/min, or in the alternative, the $I_{21}$ may be in the range of from 2.2 to 4 dg/min, or in the alternative, the $I_{21}$ may be in the range of from 2.2 to 3.6 dg/min, or in the alternative, the $I_{21}$ may be in the range of from 2.8 to 4 dg/min.

All individual values and subranges from 20 to 40 are included herein and disclosed herein; for example, the $I_{21}/I_5$ can be from a lower limit of 20, 24, 28, 32, 36 or 39 to an upper limit of 21, 25, 30, 35, or 40. For example, the $I_{21}/I_5$ of the granular polyethylene resin may be in the range of from 20 to 40, or in the alternative, the $I_{21}/I_5$ may be in the range of from 30 to 40, or in the alternative, the $I_{21}/I_5$ may be in the range of from 20 to 30.

In some embodiments, the granular polyethylene resin is further characterized by a resin particle size distribution polydispersity of from 0.6 to 1.2.

All individual values and subranges from 0.6 to 1.2 are included herein and disclosed herein; for example, the resin particle size distribution polydispersity can be from a lower limit of 0.6, 0.7, 0.8, 0.9, 1, or 1.1 to an upper limit of 0.7, 0.8, 0.9, 1, 1.1, or 1.2. For example, the resin particle size distribution polydispersity may be in the range of from 0.6 to 1.2; or in the alternative, the resin particle size distribution polydispersity may be in the range of from 0.6 to 0.9; or in the alternative, the resin particle size distribution polydispersity may be in the range of from 0.9 to 1.2; or in the alternative, the resin particle size distribution polydispersity may be in the range of from 0.8 to 1.

In certain embodiments, the granular polyethylene resin is further characterized by a resin average particle size ($APS_{PE}$) of from 0.7 mm to 1.2 mm.

All individual values and subranges from 0.7 mm to 1.2 mm are included herein and disclosed herein; for example, the $APS_{PE}$ can be from a lower limit of 0.7, 0.8, 0.9, 1, or 1.1 mm to an upper limit of 0.8, 0.9, 1, 1.1, or 1.2 mm. For example, the $APS_{PE}$ may be in the range of from 0.7 to 1.2 mm; or in the alternative, the $APS_{PE}$ may be in the range of from 0.9 to 1.2 mm; or in the alternative, the $APS_{PE}$ may be in the range of from 0.7 to 1 mm; or in the alternative, the $APS_{PE}$ may be in the range of from 0.8 to 1.1 mm, In certain embodiments, the granular polyethylene resin is further characterized by a mass median diameter ($D50_{PE}$) of from 0.45 mm to 0.85 mm.

All individual values and subranges from 0.45 to 0.85 mm are included herein and disclosed herein; for example, the $D50_{PE}$ can be from a lower limit of 0.45, 0.55, 0.65, or 0.75 mm to an upper limit of 0.55, 0.65, 0.75, or 0.85 mm. For example, the $D50_{PE}$ may be in the range of from 0.45 to 0.85 mm, or in the alternative, the $D50_{PE}$ may be in the range of from 0.65 to 0.85 mm, or in the alternative, the $D50_{PE}$ may be in the range of from 0.45 to 0.65 mm, or in the alternative, the $D50_{PE}$ may be in the range of from 0.55 to 0.75 mm.

In certain embodiments, the granular polyethylene resin is further characterized by a granular resin total void volume ($v_{total}$) of equal to or greater than 0.9 $cm^3/g$.

All individual values and subranges from equal to or greater than 0.9 are included herein and disclosed herein; for example, the total resin void volume can be from a lower limit of 0.9, 1.1 or 1.3. In some embodiments, the granular polyethylene resin is further characterized by a vinyls per polymer chain of equal to or greater than 0.85. As used herein the term “vinyls per polymer chain” is defined by the following equation:

$$(\text{vinyls per polymer chain})=(\text{vinyls}/1000\text{ carbons})\cdot(Mn/M_{CH2})/1000,$$

where: (vinyls/1000 carbons) is determined by Infrared (IR) Structural Analysis, Mn is the number average polymer molecular weight determined by GPC Analysis, and $M_{CH2}$ is the polyethylene repeating unit (—CH2-) molecular weight which is 14 amu (g/g-mole).

All individual values and subranges from equal to or greater than 0.85 are included herein and disclosed herein; for example, the vinyls per polymer chain can be from a lower limit of 0.85, 1.05 or 1.25.

In certain embodiments, the granular polyethylene resin is further characterized by Cr content of less than or equal to 0.5 ppmw. As used herein, ppmw means parts per million by weight based upon the total weight of the granular polyethylene resin.

All individual values and subranges less than or equal to 0.5 ppmw are included herein and disclosed herein; for example, the Cr content can be from an upper limit of 0.5, 0.4, 0.3, 0.2 or 0.1 ppmw.

In some embodiments, the granular polyethylene resin is further characterized by the ability to absorb equal to or greater than 45% by volume butanol based on the volume of the granular polyethylene resin. All individual values and subranges from equal to or greater than 45% by volume are included herein and disclosed herein; for example, the granular polyethylene resin may be able to absorb butanol from a lower limit of 45, 50, 55, or 60% by volume.

The various embodiments of the inventive polyethylene composition may optionally further comprise one or more additives. Exemplary additives include stabilizers, fillers, processing aids, acid neutralizers, UV stabilizers, antioxidants, process stabilizers, metal de-activators, lubricants, anti-blocking agents, antistatic agents, antimicrobial agents, chemical blowing agents, coupling agents, nucleating agents, additives to improve oxidative or chlorine resistance, pigments or colorants, and combinations thereof. A typical additive package choice may contain a mixture of phenolic and phosphite type antioxidants. In one embodiment, the polyethylene composition further comprises one or more selected from IRGANOX 1010 and IRGANOX 1076. (IRGANOX products are available from BASF).

In certain embodiments, the granular polyethylene resin is produced by a particle forming polymerization process. Particle forming polymerization processes useful in forming the granular polyethylene resin include those disclosed in PCT Publication Nos. WO 2009088701, WO2010017393 and WO2009085922, the disclosures of which are incorporated herein by reference.

In certain embodiments, the granular polyethylene resin is produced by a particle forming polymerization process utilizing a spray-dried Cr-based catalyst. Any suitable method of spray drying the Cr-based catalyst may be used herein. For example, methods for producing Cr-based catalysts are disclosed in U.S. Pat. No. 6,806,221 and PCT Publication WO2007023057, the disclosures of which are incorporated herein by reference.

In a preferred embodiment, the granular polyethylene resin is prepared by polymerization using a Cr-based catalyst. The Cr-based catalyst is preferably a chromium oxide catalyst. The chromium oxide catalysts may be $CrO_3$ or any compound convertible to $CrO_3$ under the activation conditions employed. Compounds convertible to $CrO_3$ are disclosed in U.S. Pat. Nos. 2,825,721; 3,023,203; 3,622,251; and, 4,011,382 (each incorporated herein by reference), and include chromic acetyl acetone, chromic chloride, chromic nitrate, chromic acetate, chromic sulfate, ammonium chromate, ammonium dichromate, or other soluble, chromium containing salts. Chromium (III) acetate is a preferred chromium compound.

The chromium based catalysts useful in preparing the granular polyethylene resin are deposited onto conventional catalyst supports or bases, for example, inorganic oxide materials. The inorganic oxide materials, which may be used as a support in the catalyst compositions, are porous materials having a high surface area, for example, in the range of 50 to 1000 square meters per gram, and a particle size of typically 20 to 200 micrometers. The inorganic oxides include silica, alumina, thoria, zirconia, aluminum phosphate and other comparable inorganic oxides, as well as mixtures of such oxides. Preferred supports are spray dried silica gels, particularly those with greater than 70% of their pore volume in pores with diameter greater than 100 Angstroms. The support must also have sufficient thermal stability, such that sintering of the surface will not occur at activation temperatures of 500° C. to as high as 1000° C. Particularly preferred silica gels are produced by Ineos/Philadelphia Quartz and WR Grace, and marketed under a variety of grade names.

Processes for depositing the chromium compound, oxidizable to the $Cr^{+6}$ valence state, on the support are known in the art, and may be found in the previously disclosed publications. The chromium compound is usually deposited on the support from solutions thereof, and in such quantities as to provide, after the activation step, the desired levels of chromium in the catalyst. After the compounds are placed on the supports and are activated, there results a powdery, free-flowing particulate material.

Activation of the supported chromium oxide catalyst can be accomplished at nearly any temperature up to its sintering temperature. The passage of a stream of dry air or oxygen through the supported catalyst during the activation, aids in the displacement of any water from the support, and converts, at least partially, the chrome species to $Cr^{+6}$. Activation temperatures from 300 to 900° C., for periods from greater than one hour to as high as 48 hours, are acceptable. Well dried air or oxygen is used, and the temperature is maintained below the sintering temperature of the support.

Fluoride sources may also be added during the activation process. For example, either HF or compounds that degrade to HF and $SiF_4$ are used. It is known that these compounds will act to partially sinter the surface of the support, particularly when a silica gel is used as the support. This fluoridation preferentially shrinks the smallest pores in the gel, resulting in narrower molecular weight distribution and composition distribution in the resultant polymer. This is particularly important in linear low density polymer production.

Other compounds can be added to the chromium containing catalyst support. In particular, halide free titanium compounds are added to improve the molecular weight response of the catalyst to reaction conditions. Particularly preferred compounds are titanium esters that are hydrocarbon soluble, that is, $Ti(OR)_4$, where R is a saturated hydrocarbon radical of 2 to 8 carbons. Particularly preferred are ethyl, isopropyl and butyl groups. The titanium compound may be added either directly to the fluidized bed catalyst activator, or, in a separate step, by mixing, in slurry, the chromium catalyst support and the titanium ester in a hydrocarbon solvent, followed by recovery of the reaction mixture from the solvent. When the latter method of titanium addition is used, the chromium catalyst support is preferably pre-dried to remove adsorbed water from the support. If a fluoride source will later be added, this latter method of titanium addition is highly preferred.

In certain embodiments, the granular polyethylene resin may be produced using a spray-dried, Cr-based catalyst having a Cr content of greater than or equal to 0.08% by weight. All individual values and sub-ranges greater than or equal to 0.08% by weight are included herein and disclosed herein; for example, the granular polyethylene resin may be produced using a spray-dried Cr-based catalyst having a Cr content from a lower limit of 0.08, 0.1, 0.12, 0.14, 0.16, 0.18, 0.2, 0.22, 0.24, 0.26, 0.28, 0.3, 0.32, 0.34, 0.36, 0.38, 0.4, 0.42, 0.44, 0.46 or 0.49% by weight.

In another embodiment, the granular polyethylene resin may be produced using a spray-dried Cr-based catalyst having a Cr content of greater than 0.5% by weight. All individual values and sub-ranges less than, equal to, or greater than 0.5% by weight are included herein and disclosed herein; for example, the granular polyethylene resin may be produced using a spray-dried, Cr-based catalyst having a Cr content from an upper limit of 0.1, 0.12, 0.14, 0.16, 0.18, 0.2, 0.22, 0.24, 0.26, 0.28, 0.3, 0.32, 0.34, 0.36, 0.38, 0.4, 0.42, 0.44, 0.46, 0.48, 0.5% by weight.

In alternative embodiments, the granular polyethylene resin may be produced using a spray-dried, Cr-based catalyst with a Cr content in a range having any upper limit and lower limit within the range from 0.05 to 0.5% by weight. For example, the granular polyethylene resin may be produced using a spray-dried Cr-based catalyst having a Cr content in the range of from 0.05 to 0.5% by weight, or in the alternative, from 0.08 to 0.4% by weight, or in the alternative, from 0.1 to 0.25% by weight, or in the alternative, from 0.1 to 0.45% by weight.

In some embodiments, the spray-dried Cr-based catalyst has a mass median diameter ($D50_{CAT}$) of from 45 to 65 μm.

All individual values and subranges from 45 to 65 μm are included herein and disclosed herein; for example, the $D50_{CAT}$ can be from a lower limit of 45, 47, 49, 51, 53, 55, 57, 59, 61, or 63 μm to an upper limit of 46, 48, 50, 52, 54, 56, 58, 60, 62, 64 or 65 μm. For example, the $D50_{CAT}$ may be in the range of from 45 to 65, or in the alternative, the $D50_{CAT}$ may be in the range of from 45 to 55 μm, or in the alternative, the $D50_{CAT}$ may be in the range of from 55 to 65 μm, or in the alternative, the $D50_{CAT}$ may be in the range of from 48 to 62 μm.

In some embodiments, the spray-dried, Cr-based catalyst has a particle size distribution polydispersity of from 0.6 to 1.2.

All individual values and subranges from 0.6 to 1.2 are included herein and disclosed herein; for example, the catalyst particle size distribution polydispersity can be from a lower limit of 0.6, 0.7, 0.8, 0.9, 1, or 1.1 to an upper limit of 0.7, 0.8, 0.9, 1, 1.1, or 1.2. For example, the catalyst particle size distribution polydispersity may be in the range of from 0.6 to 1.2; or in the alternative, the catalyst particle size distribution polydispersity may be in the range of from 0.6 to 0.9; or in the alternative, the catalyst particle size distribution polydispersity may be in the range of from 0.9 to 1.2; or in the alternative, the catalyst particle size distribution polydispersity may be in the range of from 0.8 to 1.

In some instances, to achieve a balance of desirable properties for a specific end use application, the granular polyethylene resin is produced in accordance with one or more control strategies.

For example, a control strategy in which melt index, $I_{21}$, and granular resin settled bulk density ($SBD_{PE}$) are optimized and balanced is particularly useful in producing an embodiment of the inventive polyethylene composition useful in producing crosslinked polyethylene pipe. Controlling $SBD_{PE}$ is tantamount to controlling the total resin void volume ($\nu_{total}$) and total resin porosity ($\Phi_{total}$) of the granular polyethylene resin. This inter-relationship is defined by the following equations, which shows how $\nu_{total}$ and $\Phi_{total}$ can be calculated:

$$SBD_{PE}=(\rho_{PE}^{-1}+\nu_{total})^{-1}=(1-\Phi_{total})\cdot\rho_{PE}$$

$$\text{Therefore: } \Phi_{total}=1-SBD_{PE}/\rho_{PE}=1-(1+\rho_{PE}\cdot\nu_{total})^{-1}$$

$$\nu_{total}=SBD_{PE}^{-1}-\rho_{PE}^{-1}=[(1-\Phi_{total})^{-1}-1]\cdot\rho_{PE}^{-1}$$

In the case of a high density homopolyethylene, resin solid density ($\rho_{PE}$) is uncontrolled, and is a weak function of $I_{21}$ ($\rho_{PE}$ increases slightly with increasing $I_{21}$). The $SBD_{PE}$ may be controlled by feeding a small amount of an irreversible catalyst poison to the process. The preferred irreversible poison is oxygen ($O_2$). The $SBD_{PE}$ decreases ($\nu_{total}$ and $\Phi_{total}$ increase) with increasing oxygen to ethylene feed ratio ($O_2/C_2$) to the process. Finally, $I_{21}$ is controlled by adjusting reactor temperature (RxT), with $I_{21}$ increasing with increasing RxT. Because $O_2/C_2$ also increases $I_{21}$ at constant reactor residence time ($\tau_{RX}$), increasing the $O_2/C_2$ should be compensated for by decreasing the RxT in order to hold $I_{21}$ constant. Such control strategy may be depicted as follows:

$O_2/C_2\uparrow$ and $RxT\downarrow$ corresponds with $SBD_{PE}\downarrow$ and $I_{21}\leftrightarrow$ (constant).

In an alternative control strategy, the intraparticle void volume ($\nu_{intraparticle}$) intraparticle porosity ($\Phi_{intraparticle}$), and granular resin particle size ($APS_{PE}$, $D50_{PE}$) are balanced by controlling the Cr content in the catalyst and the reactor residence time ($\tau_{Rx}$). $\nu_{intraparticle}$ and $\Phi_{intraparticle}$ increase with decreasing $\tau_{Rx}$. Decreasing $\tau_{Rx}$ (which increases the production rate) has the added advantage of better asset utilization and improved operating economics. Decreasing $\tau_{Rx}$ also decreases catalyst productivity (CP) and granular resin particle size ($D50_{PE}$). CP increases with increasing Cr content in the catalyst. Thus, controlling Cr content and $\tau_{Rx}$ may be used to balance $SBD_{PE}$, $D50_{PE}$, ($\nu_{intraparticle}/\nu_{interparticle}$) and ($\Phi_{intraparticle}/\Phi_{interparticle}$).

In an alternative embodiment, the instant invention further provides an article comprising any one or more of the foregoing embodiments of the polyethylene composition. Exemplary articles may include pipes, surfactants, pigments, pipe liners, plumbing appurtenances and wire and cable applications.

In certain embodiments, the polyethylene composition is crosslinked with one or more absorbable crosslinking agents selected from the group consisting of peroxides, azides, and silanes. As used herein, the term "absorbable crosslinking agent" means any or any combination of crosslinking agents which may be absorbed in or on the granular polymer particles as a step in the crosslinking process.

Examples

The following examples illustrate the present invention but are not intended to limit the scope of the invention. Tables 1-2 provide the reaction conditions and resin properties for Examples 1-4 (Inventive Examples). Tables 3-7 provide the reaction conditions and resin properties for Examples 5-13 (Comparative Examples).

TABLE 1

| | Inv. Ex. 1 | Inv. Ex. 2 |
|---|---|---|
| Catalyst Nomenclature | Grace 957 | Grace 703JB |
| Catalyst Type | Chromium Oxide | Chromium Oxide |
| Silica Catalyst Support | Sized, Spray-Dried | Sized, Spray-Dried |
| Catalyst Cr Loading | 0.20 wt % | 0.10 wt % |
| Catalyst Dehydration/Activation Temp | 825° C. | 825° C. |
| RO Add-Back Source | Oxygen | Oxygen |
| TEAL/Cr Feed Ratio | 0.46 mol/mol | 0.54 mol/mol |
| Ethylene Partial Pressure | 250 psia | 250 psia |
| Residence Time | 3.1 hours | 4.3 hours |
| Reaction Conditions | | |
| Reactor Bed Temp., ° C. | 102.8 | 100.9 |
| Reactor Ethylene Partial Pressure, psia | 250 | 250 |
| Reactor $CO/C_2H_4$ Molar Feed Ratio, ppbv | 0.0 | 0.0 |
| Reactor Corrected $CO/C_2H_4$ Molar Feed Ratio, ppbv | 0.0 | 0.0 |
| Reactor $O_2/C_2H_4$ Molar Feed Ratio, ppbv | 98.2 | 88.7 |
| Reactor Corrected $O_2/C_2H_4$ Molar Feed Ratio, ppbv | 60.2 | 48.7 |
| Reactor TEAL/Cr Mass Feed Ratio, mol/mol | 0.461 | 0.537 |
| Reactor $H_2/C_2H_4$ Molar Composition Ratio, mol/mol | 0.000 | 0.000 |
| Reactor Isopentane Composition, mol % | 0.147 | 0.102 |
| Reactor Superficial Gas Velocity, ft/sec | 1.68 | 1.71 |
| Reactor Fluidized Bulk Density, lb/ft$^3$ | 20.3 | 19.9 |
| Reactor Bed Weight, lb | 150 | 181 |
| Reactor Drum Weight Production Rate, lb/hr | 47.9 | 41.7 |
| Reactor Residence Time, hr | 3.14 | 4.34 |
| Reactor Space Time Yield, lb/hr/ft$^3$ | 6.47 | 4.60 |
| Reactor Total Monomer Ratio, lb/lb | 1.375 | 1.519 |
| Reactor Solid Catalyst Productivity, Mlb/lb Cat | 6.02 | 4.06 |
| Reactor Chromium Productivity, MMlb/lb Cr | 3.01 | 4.06 |
| Granular Residual TEAL, ppmw | 0.34 | 0.29 |
| Granular Residual Chromium, ppmw | 0.34 | 0.25 |
| Granular Settled Bulk Density, lb/ft$^3$ | 29.0 | 28.7 |
| Granular Average Particle Size, inches | 0.038 | 0.038 |
| Granular Fines, wt % | 0.18 | 0.31 |
| Granular Melt Flow Index & Density | | |
| Granular Melt Flow Index $MFI_5$, dg/min | 0.09 | 0.11 |
| Granular Melt Flow Index $MFI_{21}$, dg/min | 3.09 | 3.01 |
| Granular Melt Flow Ratio $I_{21}/I_5$ | 34.1 | 27.2 |
| Granular Resin Density, g/cc | 0.9560 | 0.9565 |
| Extruded Melt Flow Index | | |
| Extruded Melt Flow Index $MFI_{21}$, dg/min | 2.56 | 2.49 |
| Extruded Melt Flow Ratio $I_{21}/I_5$ | 32.2 | 26.0 |
| Resin Morphology | | |
| Settled Bulk Density, lb/ft$^3$ | 29.0 | 28.7 |
| Settled Bulk Density, Kg/m$^3$ | 465 | 460 |

TABLE 1-continued

| | Inv. Ex. 1 | Inv. Ex. 2 |
|---|---|---|
| Sieve Size Analysis | | |
| On 10 Mesh >2 mm, wt % | 0.66 | 0.75 |
| On 18 Mesh 1~2 mm, wt % | 39.79 | 41.82 |
| On 35 Mesh 0.5~1.0 mm, wt % | 48.35 | 46.43 |
| On 60 Mesh 0.25~0.50 mm, wt % | 9.78 | 9.21 |
| On 120 Mesh 0.125~0.250 mm, wt % | 1.24 | 1.48 |
| On 200 Mesh 0.075~0.125 mm, wt % | 0.08 | 0.20 |
| Pan <0.075 mm, wt % | 0.10 | 0.11 |
| Average Particle Size, inches | 0.038 | 0.038 |
| Average Particle Size, mm | 0.96 | 0.98 |
| Fines thru 120 Mesh <0.125 mm, wt % | 0.18 | 0.31 |
| Fines thru 200 Mesh <0.075 mm, wt % | 0.10 | 0.11 |
| Cumulative Particle Diameter | | |
| 0.037 mm, wt % | 0.103 | 0.111 |
| 0.096 mm, wt % | 0.181 | 0.313 |
| 0.176 mm, wt % | 1.416 | 1.790 |
| 0.353 mm, wt % | 11.199 | 11.004 |
| 0.708 mm, wt % | 59.545 | 57.429 |
| 1.414 mm, wt % | 99.339 | 99.253 |
| 2.823 mm, wt % | 99.999 | 99.999 |
| 10.00 wt % Particle Diameter $D_{10}$, mm | 0.35 | 0.34 |
| 15.87 wt % Particle Diameter $D_{15.87}$, mm | 0.42 | 0.42 |
| 50.00 wt % Particle Diameter $D_{50}$, mm | 0.64 | 0.65 |
| 84.13 wt % Particle Diameter $D_{84.13}$, mm | 0.92 | 0.94 |
| 90.00 wt % Particle Diameter $D_{90}$, mm | 1.00 | 1.00 |
| Geometric Std Dev: $\sigma_g = D_{84.13}/D_{50} = D_{50}/D_{15.87}$ | 1.36 | 1.39 |
| Span = $D_{90} - D_{10,\ mm}$ | 0.65 | 0.66 |
| Polydispersity = $(D_{90} - D_{10})/D_{50}$ | 1.02 | 1.02 |
| Resin Void Volume | | |
| Intraparticle Void Volume, cc/g | 0.389 | 0.281 |
| Interparticle Void Volume, cc/g | 0.716 | 0.847 |
| Total Resin Void Volume, cc/g | 1.105 | 1.128 |
| Intraparticle Porosity, volume fraction | 0.181 | 0.129 |
| Interparticle Porosity, volume fraction | 0.333 | 0.390 |
| Total Resin Porosity, volume fraction | 0.514 | 0.519 |
| Intraparticle/Interparticle Porosity Ratio | 0.543 | 0.332 |
| MWD (GPC) | | |
| Mn | 24,650 | 23,560 |
| Mw | 240,110 | 236,260 |
| Mz | 1,258,400 | 1,163,600 |
| Mw/Mn | 9.74 | 10.03 |
| Mz/Mw | 5.24 | 4.93 |
| Polymer Structure - Unsaturation | | |
| Vinyls/1000 Carbons | 0.631 | 0.619 |
| Vinyls/Polymer Chain | 1.11 | 1.04 |

TABLE 2

| | Inv. Ex. 3 | Inv. Ex. 4 |
|---|---|---|
| Catalyst Nomenclature | Grace 703JB | Grace 703JB |
| Catalyst Type | Chromium Oxide | Chromium Oxide |
| Silica Catalyst Support | Sized, Spray-Dried | Sized, Spray-Dried |
| Catalyst Cr Loading | 0.10 wt % | 0.10 wt % |
| Catalyst Dehydration/Activation Temp | 700° C. | 825° C. |
| RO Add-Back Source | Oxygen | Oxygen |
| TEAL/Cr Feed Ratio | 0.52 mol/mol | 0.00 mol/mol |
| Ethylene Partial Pressure | 250 psia | 250 psia |
| Residence Time | 4.4 hours | 5.3 hours |
| Reaction Conditions | | |
| Reactor Bed Temp., ° C. | 105.4 | 99.1 |
| Reactor Ethylene Partial Pressure, psia | 250 | 250 |
| Reactor $CO/C_2H_4$ Molar Feed Ratio, ppbv | 0.0 | 0.0 |
| Reactor Corrected $CO/C_2H_4$ Molar Feed Ratio, ppbv | 0.0 | 0.0 |
| Reactor $O_2/C_2H_4$ Molar Feed Ratio, ppbv | 52.4 | 86.2 |
| Reactor Corrected $O_2/C_2H_4$ Molar Feed Ratio, ppbv | 33.3 | 44.5 |
| Reactor TEAL/Cr Mass Feed Ratio, mol/mol | 0.517 | 0.000 |

TABLE 2-continued

| | Inv. Ex. 3 | Inv. Ex. 4 |
|---|---|---|
| Reactor $H_2/C_2H_4$ Molar Composition Ratio, mol/mol | 0.000 | 0.000 |
| Reactor Isopentane Composition, mol % | 0.432 | 0.000 |
| Reactor Superficial Gas Velocity, ft/sec | 1.81 | 1.65 |
| Reactor Fluidized Bulk Density, lb/ft$^3$ | 19.9 | 19.2 |
| Reactor Bed Weight, lb | 180 | 185 |
| Reactor Drum Weight Production Rate, lb/hr | 40.6 | 35.4 |
| Reactor Residence Time, hr | 4.43 | 5.32 |
| Reactor Space Time Yield, lb/hr/ft$^3$ | 4.51 | 3.67 |
| Reactor Total Monomer Ratio, lb/lb | 1.581 | 1.726 |
| Reactor Solid Catalyst Productivity, Mlb/lb Cat | 3.43 | 4.01 |
| Reactor Chromium Productivity, MMlb/lb Cr | 3.43 | 4.01 |
| Granular Residual TEAL, ppmw | 0.33 | 0.00 |
| Granular Residual Chromium, ppmw | 0.29 | 0.25 |
| Granular Settled Bulk Density, lb/ft$^3$ | 29.3 | 29.0 |
| Granular Average Particle Size, inches | 0.034 | 0.034 |
| Granular Fines, wt % | 0.32 | 0.35 |
| Granular Melt Flow Index & Density | | |
| Granular Melt Flow Index $MFI_5$, dg/min | 0.15 | 0.16 |
| Granular Melt Flow Index $MFI_{21}$, dg/min | 2.97 | 3.05 |
| Granular Melt Flow Ratio $I_{21}/I_5$ | 20.2 | 21.0 |
| Granular Resin Density, g/cc | 0.9564 | 0.9572 |
| Extruded Melt Flow Index | | |
| Extruded Melt Flow Index $MFI_{21}$, dg/min | 2.64 | 2.50 |
| Extruded Melt Flow Ratio $I_{21}/I_5$ | 19.0 | 20.3 |
| Resin Morphology | | |
| Settled Bulk Density, lb/ft$^3$ | 29.3 | 29.0 |
| Settled Bulk Density, Kg/m$^3$ | 469 | 464 |
| Sieve Size Analysis | | |
| On 10 Mesh >2 mm, wt % | 0.14 | 0.37 |
| On 18 Mesh 1~2 mm, wt % | 28.42 | 28.42 |
| On 35 Mesh 0.5~1.0 mm, wt % | 58.33 | 54.64 |
| On 60 Mesh 0.25~0.50 mm, wt % | 11.06 | 13.82 |
| On 120 Mesh 0.125~0.250 mm, wt % | 1.73 | 2.40 |
| On 200 Mesh 0.075~0.125 mm, wt % | 0.14 | 0.16 |
| Pan <0.075 mm, wt % | 0.18 | 0.20 |
| Average Particle Size, inches | 0.034 | 0.034 |
| Average Particle Size, mm | 0.86 | 0.85 |
| Fines thru 120 Mesh <0.125 mm, wt % | 0.32 | 0.35 |
| Fines thru 200 Mesh <0.075 mm, wt % | 0.18 | 0.20 |
| Cumulative Particle Diameter | | |
| 0.037 mm, wt % | 0.182 | 0.196 |
| 0.096 mm, wt % | 0.319 | 0.351 |
| 0.176 mm, wt % | 2.044 | 2.747 |
| 0.353 mm, wt % | 13.108 | 16.565 |
| 0.708 mm, wt % | 71.440 | 71.201 |
| 1.414 mm, wt % | 99.862 | 99.625 |
| 2.823 mm, wt % | 99.999 | 99.999 |
| 10.00 wt % Particle Diameter $D_{10}$, mm | 0.32 | 0.30 |
| 15.87 wt % Particle Diameter $D_{15.87}$, mm | 0.37 | 0.36 |
| 50.00 wt % Particle Diameter $D_{50}$, mm | 0.57 | 0.57 |
| 84.13 wt % Particle Diameter $D_{84.13}$, mm | 0.84 | 0.84 |
| 90.00 wt % Particle Diameter $D_{90}$, mm | 0.92 | 0.90 |
| Geometric Std Dev: $\sigma_g = D_{84.13}/D_{50} = D_{50}/D_{15.87}$ | 1.35 | 1.39 |
| Span = $D_{90} - D_{10,\ mm}$ | 0.60 | 0.60 |
| Polydispersity = $(D_{90} - D_{10})/D_{50}$ | 1.05 | 1.05 |
| Resin Void Volume | | |
| Intraparticle Void Volume, cc/g | 0.282 | 0.306 |
| Interparticle Void Volume, cc/g | 0.800 | 0.799 |
| Total Resin Void Volume, cc/g | 1.082 | 1.106 |
| Intraparticle Porosity, volume fraction | 0.133 | 0.143 |
| Interparticle Porosity, volume fraction | 0.377 | 0.372 |
| Total Resin Porosity, volume fraction | 0.510 | 0.515 |
| Intraparticle/Interparticle Porosity Ratio | 0.353 | 0.383 |
| MWD (GPC) | | |
| Mn | 24,350 | 25,610 |
| Mw | 254,420 | 254,350 |
| Mz | 1,192,600 | 1,399,000 |
| Mw/Mn | 10.45 | 9.93 |
| Mz/Mw | 4.69 | 5.50 |

TABLE 2-continued

| | Inv. Ex. 3 | Inv. Ex. 4 |
|---|---|---|
| Polymer Structure - Unsaturation | | |
| Vinyls/1000 Carbons | 0.598 | 0.591 |
| Vinyls/Polymer Chain | 1.04 | 1.08 |

TABLE 3

| | Ex. 5 |
|---|---|
| Catalyst Nomenclature | Grace 703JB |
| Catalyst Type | Chromium Oxide |
| Silica Catalyst Support | Sized, Spray-Dried |
| Catalyst Cr Loading | 0.10 wt % |
| Catalyst Dehydration/Activation Temp | 825° C. |
| RO Add-Back Source | Oxygen |
| TEAL/Cr Feed Ratio | 0.55 mol/mol |
| Ethylene Partial Pressure | 250 psia |
| Residence Time | 9.0 hours |
| Reaction Conditions | |
| Reactor Bed Temp., ° C. | 99.3 |
| Reactor Ethylene Partial Pressure, psia | 250 |
| Reactor $CO/C_2H_4$ Molar Feed Ratio, ppbv | 0.0 |
| Reactor Corrected $CO/C_2H_4$ Molar Feed Ratio, ppbv | 0.0 |
| Reactor $O_2/C_2H_4$ Molar Feed Ratio, ppbv | 108.6 |
| Reactor Corrected $O_2/C_2H_4$ Molar Feed Ratio, ppbv | 55.6 |
| Reactor TEAL/Cr Mass Feed Ratio, mol/mol | 0.549 |
| Reactor $H_2/C_2H_4$ Molar Composition Ratio, mol/mol | 0.000 |
| Reactor Isopentane Composition, mol % | 0.038 |
| Reactor Superficial Gas Velocity, ft/sec | 1.70 |
| Reactor Fluidized Bulk Density, lb/ft$^3$ | 20.3 |
| Reactor Bed Weight, lb | 199 |
| Reactor Drum Weight Production Rate, lb/hr | 22.2 |
| Reactor Residence Time, hr | 9.05 |
| Reactor Space Time Yield, lb/hr/ft$^3$ | 2.26 |
| Reactor Total Monomer Ratio, lb/lb | 2.185 |
| Reactor Solid Catalyst Productivity, Mlb/lb Cat | 4.24 |
| Reactor Chromium Productivity, MMlb/lb Cr | 4.24 |
| Granular Residual TEAL, ppmw | 0.28 |
| Granular Residual Chromium, ppmw | 0.24 |
| Granular Settled Bulk Density, lb/ft$^3$ | 29.3 |
| Granular Average Particle Size, inches | 0.038 |
| Granular Fines, wt % | 0.24 |
| Granular Melt Flow Index & Density | |
| Granular Melt Flow Index $MFI_5$, dg/min | 0.13 |
| Granular Melt Flow Index $MFI_{21}$, dg/min | 3.09 |
| Granular Melt Flow Ratio $I_{21}/I_5$ | 23.8 |
| Granular Resin Density, g/cc | 0.9568 |
| Extruded Melt Flow Index | |
| Extruded Melt Flow Index $MFI_{21}$, dg/min | 2.67 |
| Extruded Melt Flow Ratio $I_{21}/I_5$ | 23.5 |
| Resin Morphology | |
| Settled Bulk Density, lb/ft$^3$ | 29.3 |
| Settled Bulk Density, Kg/m$^3$ | 470 |

TABLE 3-continued

| | Ex. 5 |
|---|---|
| Sieve Size Analysis | |
| On 10 Mesh >2 mm, wt % | 1.05 |
| On 18 Mesh 1~2 mm, wt % | 40.93 |
| On 35 Mesh 0.5~1.0 mm, wt % | 43.36 |
| On 60 Mesh 0.25~0.50 mm, wt % | 11.35 |
| On 120 Mesh 0.125~0.250 mm, wt % | 3.06 |
| On 200 Mesh 0.075~0.125 mm, wt % | 0.19 |
| Pan <0.075 mm, wt % | 0.05 |
| Average Particle Size, inches | 0.038 |
| Average Particle Size, mm | 0.96 |
| Fines thru 120 Mesh <0.125 mm, wt % | 0.24 |
| Fines thru 200 Mesh <0.075 mm, wt % | 0.05 |
| Cumulative Particle Diameter | |
| 0.037 mm, wt % | 0.052 |
| 0.096 mm, wt % | 0.240 |
| 0.176 mm, wt % | 3.300 |
| 0.353 mm, wt % | 14.649 |
| 0.708 mm, wt % | 58.012 |
| 1.414 mm, wt % | 98.946 |
| 2.823 mm, wt % | 99.999 |
| 10.00 wt % Particle Diameter $D_{10}$, mm | 0.30 |
| 15.87 wt % Particle Diameter $D_{15.87}$, mm | 0.38 |
| 50.00 wt % Particle Diameter $D_{50}$, mm | 0.64 |
| 84.13 wt % Particle Diameter $D_{84.13}$, mm | 0.92 |
| 90.00 wt % Particle Diameter $D_{90}$, mm | 0.97 |
| Geometric Std Dev: $\sigma_g = D_{84.13}/D_{50} = D_{50}/D_{15.87}$ | 1.48 |
| Span = $D_{90} - D_{10}$, mm | 0.67 |
| Polydispersity = $(D_{90} - D_{10})/D_{50}$ | 1.05 |
| Resin Void Volume | |
| Intraparticle Void Volume, cc/g | 0.197 |
| Interparticle Void Volume, cc/g | 0.886 |
| Total Resin Void Volume, cc/g | 1.083 |
| Intraparticle Porosity, volume fraction | 0.093 |
| Interparticle Porosity, volume fraction | 0.416 |
| Total Resin Porosity, volume fraction | 0.509 |
| Intraparticle/Interparticle Porosity Ratio | 0.222 |
| MWD (GPC) | |
| Mn | 21,700 |
| Mw | 226,840 |
| Mz | 1,127,300 |
| Mw/Mn | 10.45 |
| Mz/Mw | 4.97 |
| Polymer Structure - Unsaturation | |
| Vinyls/1000 Carbons | 0.657 |
| Vinyls/Polymer Chain | 1.02 |

TABLE 4

| | Ex. 6 | Ex. 7 |
|---|---|---|
| Catalyst Nomenclature | EP30XA | EP30XA |
| Catalyst Type | Chromium Oxide | Chromium Oxide |
| Silica Catalyst Support | Sized, Ground Silica | Sized, Ground Silica |
| Catalyst Cr Loading | 0.25 wt % | 0.25 wt % |
| Catalyst Dehydration/Activation Temp | 825° C. | 825° C. |
| RO Add-Back Source | Oxygen | Oxygen |
| TEAL/Cr Feed Ratio | 0.62 mol/mol | 0.40 mol/mol |

TABLE 4-continued

| | Ex. 6 | Ex. 7 |
|---|---|---|
| Ethylene Partial Pressure | 249 psia | 125 psia |
| Residence Time | 3.4 hours | 3.4 hours |
| Reaction Conditions | | |
| Reactor Bed Temp., ° C. | 98.5 | 97.3 |
| Reactor Ethylene Partial Pressure, psia | 249 | 125 |
| Reactor $CO/C_2H_4$ Molar Feed Ratio, ppbv | | |
| Reactor Corrected $CO/C_2H_4$ Molar Feed Ratio, ppbv | | |
| Reactor $O_2/C_2H_4$ Molar Feed Ratio, ppbv | 20.5 | 23.1 |
| Reactor Corrected $O_2/C_2H_4$ Molar Feed Ratio, ppbv | | |
| Reactor TEAL/Cr Mass Feed Ratio, mol/mol | 0.616 | 0.401 |
| Reactor $H_2/C_2H_4$ Molar Composition Ratio, mol/mol | 0.010 | 0.010 |
| Reactor Isopentane Composition, mol % | 2.909 | 2.942 |
| Reactor Superficial Gas Velocity, ft/sec | 1.77 | 1.89 |
| Reactor Fluidized Bulk Density, lb/ft$^3$ | 19.2 | 18.2 |
| Reactor Bed Weight, lb | 139 | 141 |
| Reactor Drum Weight Production Rate, lb/hr | 40.7 | 41.6 |
| Reactor Residence Time, hr | 3.41 | 3.41 |
| Reactor Space Time Yield, lb/hr/ft$^3$ | 5.64 | 5.38 |
| Reactor Total Monomer Ratio, lb/lb | 1.573 | 1.118 |
| Reactor Solid Catalyst Productivity, Mlb/lb Cat | 8.00 | 5.23 |
| Reactor Chromium Productivity, MMlb/lb Cr | 3.20 | 2.09 |
| Granular Residual TEAL, ppmw | 0.42 | 0.42 |
| Granular Residual Chromium, ppmw | 0.32 | 0.49 |
| Granular Settled Bulk Density, lb/ft$^3$ | 27.2 | 26.6 |
| Granular Average Particle Size, inches | 0.073 | 0.065 |
| Granular Fines, wt % | 0.40 | 0.25 |
| Granular Melt Flow Index & Density | | |
| Granular Melt Flow Index $MFI_5$, dg/min | 0.09 | 0.09 |
| Granular Melt Flow Index $MFI_{21}$, dg/min | 3.05 | 3.01 |
| Granular Melt Flow Ratio $I_{21}/I_5$ | 32.2 | 34.4 |
| Granular Resin Density, g/cc | 0.9558 | 0.9555 |
| Extruded Melt Flow Index | | |
| Extruded Melt Flow Index $MFI_{21}$, dg/min | 2.46 | 2.55 |
| Extruded Melt Flow Ratio $I_{21}/I_5$ | | |
| Resin Morphology | | |
| Settled Bulk Density, lb/ft$^3$ | 27.2 | 26.6 |
| Settled Bulk Density, Kg/m$^3$ | 435 | 425 |
| Sieve Size Analysis | | |
| On 10 Mesh >2 mm, wt % | 38.11 | 26.72 |
| On 18 Mesh 1~2 mm, wt % | 51.09 | 56.79 |
| On 35 Mesh 0.5~1.0 mm, wt % | 8.53 | 12.48 |
| On 60 Mesh 0.25~0.50 mm, wt % | 1.46 | 2.88 |
| On 120 Mesh 0.125~0.250 mm, wt % | 0.42 | 0.87 |
| On 200 Mesh 0.075~0.125 mm, wt % | 0.24 | 0.21 |
| Pan <0.075 mm, wt % | 0.16 | 0.04 |
| Average Particle Size, inches | 0.073 | 0.065 |
| Average Particle Size, mm | 1.87 | 1.66 |
| Fines thru 120 Mesh <0.125 mm, wt % | 0.40 | 0.25 |
| Fines thru 200 Mesh <0.075 mm, wt % | 0.16 | 0.04 |
| Cumulative Particle Diameter | | |
| 0.037 mm, wt % | 0.157 | 0.040 |
| 0.096 mm, wt % | 0.398 | 0.254 |
| 0.176 mm, wt % | 0.818 | 1.120 |
| 0.353 mm, wt % | 2.276 | 4.004 |
| 0.708 mm, wt % | 10.804 | 16.489 |
| 1.414 mm, wt % | 61.895 | 73.282 |
| 2.823 mm, wt % | 99.999 | 99.999 |
| 10.00 wt % Particle Diameter $D_{10}$, mm | 0.68 | 0.58 |
| 15.87 wt % Particle Diameter $D_{15.87}$, mm | 0.83 | 0.71 |
| 50.00 wt % Particle Diameter $D_{50}$, mm | 1.27 | 1.15 |
| 84.13 wt % Particle Diameter $D_{84.13}$, mm | 1.72 | 1.59 |
| 90.00 wt % Particle Diameter $D_{90}$, mm | 1.83 | 1.71 |
| Geometric Std Dev: $\sigma_g = D_{84.13}/D_{50} = D_{50}/D_{15.87}$ | 1.38 | 1.42 |
| Span = $D_{90} - D_{10}$,mm | 1.15 | 1.13 |
| Polydispersity = $(D_{90} - D_{10})/D_{50}$ | 0.91 | 0.98 |
| Resin Void Volume | | |
| Intraparticle Void Volume, cc/g | 0.270 | 0.306 |
| Interparticle Void Volume, cc/g | 0.857 | 0.831 |
| Total Resin Void Volume, cc/g | 1.128 | 1.137 |
| Intraparticle Porosity, volume fraction | 0.130 | 0.149 |
| Interparticle Porosity, volume fraction | 0.414 | 0.405 |

TABLE 4-continued

| | Ex. 6 | Ex. 7 |
|---|---|---|
| Total Resin Porosity, volume fraction | 0.545 | 0.555 |
| Intraparticle/Interparticle Porosity Ratio | 0.315 | 0.368 |
| MWD (GPC) | | |
| Mn | 28570; 27840* | 22,430 |
| Mw | 215140; 256500* | 287,500 |
| Mz | 926800; 1431000* | 2,324,000 |
| Mw/Mn | 7.53; 9.21* | 12.82 |
| Mz/Mw | 4.31; 5.58* | 8.08 |
| Polymer Structure - Unsaturation | | |
| Vinyls/1000 Carbons | 0.581, 0.501* | 0.488 |
| Vinyls/Polymer Chain | 1.19, 1.00* | 0.78 |

*Two separate measurements on the same sample.

TABLE 5

| | Ex. 8 | Ex. 9 |
|---|---|---|
| Catalyst Nomenclature | Grace 703JB | Grace 703JB |
| Catalyst Type | Chromium Oxide | Chromium Oxide |
| Silica Catalyst Support | Sized, Spray-Dried | Sized, Spray-Dried |
| Catalyst Cr Loading | 0.10 wt % | 0.10 wt % |
| Catalyst Dehydration/Activation Temp | 825° C. | 700° C. |
| RO Add-Back Source | (none) | Carbon Monoxide |
| TEAL/Cr Feed Ratio | 0.62 mol/mol | 0.51 mol/mol |
| Ethylene Partial Pressure | 250 psia | 250 psia |
| Residence Time | 4.1 hours | 4.6 hours |
| Reaction Conditions | | |
| Reactor Bed Temp., ° C. | 102.3 | 109.3 |
| Reactor Ethylene Partial Pressure, psia | 250 | 250 |
| Reactor $CO/C_2H_4$ Molar Feed Ratio, ppbv | 0.0 | 533.7 |
| Reactor Corrected $CO/C_2H_4$ Molar Feed Ratio, ppbv | 0.0 | 142.4 |
| Reactor $O_2/C_2H_4$ Molar Feed Ratio, ppbv | 0.0 | 0.0 |
| Reactor Corrected $O_2/C_2H_4$ Molar Feed Ratio, ppbv | 0.0 | 0.0 |
| Reactor TEAL/Cr Mass Feed Ratio, mol/mol | 0.624 | 0.513 |
| Reactor $H_2/C_2H_4$ Molar Composition Ratio, mol/mol | 0.000 | 0.000 |
| Reactor Isopentane Composition, mol % | 2.476 | 0.116 |
| Reactor Superficial Gas Velocity, ft/sec | 1.79 | 1.70 |
| Reactor Fluidized Bulk Density, lb/ft$^3$ | 23.7 | 22.2 |
| Reactor Bed Weight, lb | 176 | 181 |
| Reactor Drum Weight Production Rate, lb/hr | 43.4 | 39.8 |
| Reactor Residence Time, hr | 4.05 | 4.56 |
| Reactor Space Time Yield, lb/hr/ft$^3$ | 5.86 | 4.89 |
| Reactor Total Monomer Ratio, lb/lb | 1.496 | 1.599 |
| Reactor Solid Catalyst Productivity, Mlb/lb Cat | 7.06 | 3.42 |
| Reactor Chromium Productivity, MMlb/lb Cr | 7.06 | 3.42 |
| Granular Residual TEAL, ppmw | 0.19 | 0.33 |
| Granular Residual Chromium, ppmw | 0.14 | 0.29 |
| Granular Settled Bulk Density, lb/ft$^3$ | 32.5 | 32.3 |
| Granular Average Particle Size, inches | 0.046 | 0.035 |
| Granular Fines, wt % | 0.06 | 0.26 |
| Granular Melt Flow Index & Density | | |
| Granular Melt Flow Index $MFI_5$, dg/min | 0.12 | 0.19 |
| Granular Melt Flow Index $MFI_{21}$, dg/min | 3.01 | 3.05 |
| Granular Melt Flow Ratio $I_{21}/I_5$ | 25.7 | 15.8 |
| Granular Resin Density, g/cc | 0.9563 | 0.9563 |
| Extruded Melt Flow Index | | |
| Extruded Melt Flow Index $MFI_{21}$, dg/min | 2.38 | 2.71 |
| Extruded Melt Flow Ratio $I_{21}/I_5$ | 24.4 | 15.5 |
| Resin Morphology | | |
| Settled Bulk Density, lb/ft$^3$ | 32.5 | 32.3 |
| Settled Bulk Density, Kg/m$^3$ | 521 | 517 |
| Sieve Size Analysis | | |
| On 10 Mesh >2 mm, wt % | 3.13 | 0.19 |
| On 18 Mesh 1~2 mm, wt % | 61.44 | 30.72 |
| On 35 Mesh 0.5~1.0 mm, wt % | 27.36 | 57.49 |

TABLE 5-continued

| | Ex. 8 | Ex. 9 |
|---|---|---|
| On 60 Mesh 0.25~0.50 mm, wt % | 6.83 | 10.34 |
| On 120 Mesh 0.125~0.250 mm, wt % | 1.18 | 1.01 |
| On 200 Mesh 0.075~0.125 mm, wt % | 0.03 | 0.13 |
| Pan <0.075 mm, wt % | 0.03 | 0.13 |
| Average Particle Size, inches | 0.046 | 0.035 |
| Average Particle Size, mm | 1.17 | 0.88 |
| Fines thru 120 Mesh <0.125 mm, wt % | 0.06 | 0.26 |
| Fines thru 200 Mesh <0.075 mm, wt % | 0.03 | 0.13 |
| Cumulative Particle Diameter | | |
| 0.037 mm, wt % | 0.028 | 0.127 |
| 0.096 mm, wt % | 0.060 | 0.259 |
| 0.176 mm, wt % | 1.242 | 1.265 |
| 0.353 mm, wt % | 8.070 | 11.600 |
| 0.708 mm, wt % | 35.434 | 69.088 |
| 1.414 mm, wt % | 96.877 | 99.804 |
| 2.823 mm, wt % | 99.999 | 99.999 |
| 10.00 wt % Particle Diameter $D_{10}$, mm | 0.38 | 0.33 |
| 15.87 wt % Particle Diameter $D_{15.87}$, mm | 0.50 | 0.39 |
| 50.00 wt % Particle Diameter $D_{50}$, mm | 0.80 | 0.61 |
| 84.13 wt % Particle Diameter $D_{84.13}$, mm | 1.06 | 0.86 |
| 90.00 wt % Particle Diameter $D_{90}$, mm | 1.17 | 0.93 |
| Geometric Std Dev: $\sigma_g = D_{84.13}/D_{50} = D_{50}/D_{15.87}$ | 1.46 | 1.37 |
| Span = $D_{90} - D_{10}$, mm | 0.79 | 0.60 |
| Polydispersity = $(D_{90} - D_{10})/D_{50}$ | 0.99 | 0.98 |
| Resin Void Volume | | |
| Total Resin Void Volume, cc/g | 0.873 | 0.887 |
| Total Resin Porosity, volume fraction | 0.455 | 0.459 |

TABLE 6

| | Ex. 10 | Ex. 11 |
|---|---|---|
| Catalyst Nomenclature | UCAT ™ B-100 | EP30XA |
| Catalyst Type | Chromium Oxide | Chromium Oxide |
| Silica Catalyst Support | Standard Size, Spray-Dried | Sized, Ground Silica |
| Catalyst Cr Loading | 0.20 wt % | 0.25 wt % |
| Catalyst Dehydration/Activation Temp | 825° C. | 700° C. |
| RO Add-Back Source | Oxygen | Oxygen |
| TEAL/Cr Feed Ratio | 0.38 mol/mol | 0.44 mol/mol |
| Ethylene Partial Pressure | 100 psia | 249 psia |
| Residence Time | 3.9 hours | 3.6 hours |
| Reaction Conditions | | |
| Reactor Bed Temp., ° C. | 98.4 | 102.6 |
| Reactor Ethylene Partial Pressure, psia | 100 | 249 |
| Reactor $CO/C_2H_4$ Molar Feed Ratio, ppbv | | |
| Reactor Corrected $CO/C_2H_4$ Molar Feed Ratio, ppbv | | |
| Reactor $O_2/C_2H_4$ Molar Feed Ratio, ppbv | 22.8 | 20.4 |
| Reactor Corrected $O_2/C_2H_4$ Molar Feed Ratio, ppbv | | |
| Reactor TEAL/Cr Mass Feed Ratio, mol/mol | 0.380 | 0.437 |
| Reactor $H_2/C_2H_4$ Molar Composition Ratio, mol/mol | 0.010 | 0.010 |
| Reactor Isopentane Composition, mol % | 0.000 | 1.411 |
| Reactor Superficial Gas Velocity, ft/sec | 1.54 | 1.78 |
| Reactor Fluidized Bulk Density, lb/ft$^3$ | 22.6 | 17.1 |
| Reactor Bed Weight, lb | 175 | 148 |
| Reactor Drum Weight Production Rate, lb/hr | 45.4 | 41.6 |
| Reactor Residence Time, hr | 3.87 | 3.55 |
| Reactor Space Time Yield, lb/hr/ft$^3$ | 5.86 | 4.83 |
| Reactor Total Monomer Ratio, lb/lb | 1.060 | 1.545 |
| Reactor Solid Catalyst Productivity, Mlb/lb Cat | 3.51 | 5.79 |
| Reactor Chromium Productivity, MMlb/lb Cr | 1.76 | 2.32 |
| Granular Residual TEAL, ppmw | 0.47 | 0.41 |
| Granular Residual Chromium, ppmw | 0.57 | 0.44 |
| Granular Settled Bulk Density, lb/ft$^3$ | 33.3 | 25.8 |
| Granular Average Particle Size, inches | 0.033 | 0.069 |
| Granular Fines, wt % | 0.51 | 0.24 |
| Granular Melt Flow Index & Density | | |
| Granular Melt Flow Index $MFI_5$, dg/min | 0.10 | 0.13 |
| Granular Melt Flow Index $MFI_{21}$, dg/min | 3.14 | 3.04 |
| Granular Melt Flow Ratio $I_{21}/I_5$ | 30.9 | 24.2 |

TABLE 6-continued

| | Ex. 10 | Ex. 11 |
|---|---|---|
| Granular Resin Density, g/cc | 0.9560 | 0.9563 |
| Extruded Melt Flow Index | | |
| Extruded Melt Flow Index $MFI_{21}$, dg/min | 2.71 | 2.61 |
| Extruded Melt Flow Ratio $I_{21}/I_5$ | | |
| Resin Morphology | | |
| Settled Bulk Density, lb/ft$^3$ | 33.3 | 25.8 |
| Settled Bulk Density, Kg/m$^3$ | 533 | 413 |
| Sieve Size Analysis | | |
| On 10 Mesh >2 mm, wt % | 1.81 | 33.09 |
| On 18 Mesh 1~2 mm, wt % | 26.63 | 54.50 |
| On 35 Mesh 0.5~1.0 mm, wt % | 45.43 | 9.70 |
| On 60 Mesh 0.25~0.50 mm, wt % | 22.38 | 1.94 |
| On 120 Mesh 0.125~0.250 mm, wt % | 3.18 | 0.50 |
| On 200 Mesh 0.075~0.125 mm, wt % | 0.43 | 0.18 |
| Pan <0.075 mm, wt % | 0.15 | 0.08 |
| Average Particle Size, inches | 0.033 | 0.069 |
| Average Particle Size, mm | 0.83 | 1.76 |
| Fines thru 120 Mesh <0.125 mm, wt % | 0.51 | 0.24 |
| Fines thru 200 Mesh <0.075 mm, wt % | 0.15 | 0.08 |
| Cumulative Particle Diameter | | |
| 0.037 mm, wt % | 0.148 | 0.084 |
| 0.096 mm, wt % | 0.576 | 0.268 |
| 0.176 mm, wt % | 3.758 | 0.765 |
| 0.353 mm, wt % | 26.138 | 2.703 |
| 0.708 mm, wt % | 71.565 | 12.406 |
| 1.414 mm, wt % | 98.192 | 66.904 |
| 2.823 mm, wt % | 99.999 | 99.999 |
| 10.00 wt % Particle Diameter $D_{10}$, mm | 0.23 | 0.66 |
| 15.87 wt % Particle Diameter $D_{15.87}$, mm | 0.28 | 0.79 |
| 50.00 wt % Particle Diameter $D_{50}$, mm | 0.52 | 1.23 |
| 84.13 wt % Particle Diameter $D_{84.13}$, mm | 0.88 | 1.69 |
| 90.00 wt % Particle Diameter $D_{90}$, mm | 1.00 | 1.82 |
| Geometric Std Dev: $\sigma_g = D_{84.13}/D_{50} = D_{50}/D_{15.87}$ | 1.54 | 1.38 |
| Span = $D_{90} - D_{10}$, mm | 0.77 | 1.16 |
| Polydispersity = $(D_{90} - D_{10})/D_{50}$ | 1.48 | 0.94 |
| Resin Void Volume | | |
| Intraparticle Void Volume, cc/g | 0.302 | 0.281 |
| Interparticle Void Volume, cc/g | 0.488 | 1.070 |
| Total Resin Void Volume, cc/g | 0.790 | 1.351 |
| Intraparticle Porosity, volume fraction | 0.169 | 0.118 |
| Interparticle Porosity, volume fraction | 0.273 | 0.450 |
| Total Resin Porosity, volume fraction | 0.442 | 0.568 |
| Intraparticle/Interparticle Porosity Ratio | 0.619 | 0.263 |
| MWD (GPC) | | |
| Mn | 25,060 | 19,690 |
| Mw | 226,780 | 238,700 |
| Mz | 1,092,000 | 1,051,000 |
| Mw/Mn | 9.05 | 12.12 |
| Mz/Mw | 4.82 | 4.40 |
| Polymer Structure - Unsaturation | | |
| Vinyls/1000 Carbons | 0.594 | 0.471 |
| Vinyls/Polymer Chain | 1.06 | 0.66 |

TABLE 7

| | Ex. 12 | Ex. 13 |
|---|---|---|
| Catalyst Nomenclature | UCAT ™ B-175 | UCAT ™ G-150 |
| Catalyst Type | Chromium Oxide | Silyl Chromate |
| Silica Catalyst Support | Standard Size, Spray-Dried | Standard Size, Spray-Dried |
| Catalyst Cr Loading | 0.50 wt % | 0.25 wt % |
| Catalyst Dehydration/Activation Temp | 825° C. | 600° C. |
| RO Add-Back Source | Oxygen | Oxygen |
| TEAL/Cr Feed Ratio | 0.14 mol/mol | 0.99 mol/mol |
| Ethylene Partial Pressure | 248 psia | 224 psia |
| Residence Time | 3.1 hours | 3.5 hours |

TABLE 7-continued

| | Ex. 12 | Ex. 13 |
|---|---|---|
| Reaction Conditions | | |
| Reactor Bed Temp., ° C. | 96.0 | 95.3 |
| Reactor Ethylene Partial Pressure, psia | 248 | 224 |
| Reactor $CO/C_2H_4$ Molar Feed Ratio, ppbv | | |
| Reactor Corrected $CO/C_2H_4$ Molar Feed Ratio, ppbv | | |
| Reactor $O_2/C_2H_4$ Molar Feed Ratio, ppbv | 26.2 | 0.0 |
| Reactor Corrected $O_2/C_2H_4$ Molar Feed Ratio, ppbv | 26.2 | 0.0 |
| Reactor TEAL/Cr Mass Feed Ratio, mol/mol | 0.144 | 0.987 |
| Reactor $H_2/C_2H_4$ Molar Composition Ratio, mol/mol | 0.050 | 0.050 |
| Reactor Isopentane Composition, mol % | 0.000 | 0.000 |
| Reactor Superficial Gas Velocity, ft/sec | 1.69 | 1.59 |
| Reactor Fluidized Bulk Density, lb/ft$^3$ | 23.8 | 24.1 |
| Reactor Bed Weight, lb | 174 | 176 |
| Reactor Drum Weight Production Rate, lb/hr | 56.1 | 50.7 |
| Reactor Residence Time, hr | 3.12 | 3.48 |
| Reactor Space Time Yield, lb/hr/ft$^3$ | 7.70 | 6.94 |
| Reactor Total Monomer Ratio, lb/lb | 1.272 | 1.277 |
| Reactor Solid Catalyst Productivity, Mlb/lb Cat | 8.15 | 3.64 |
| Reactor Chromium Productivity, MMlb/lb Cr | 1.63 | 1.46 |
| Granular Residual TEAL, ppmw | | |
| Granular Residual Chromium, ppmw | 0.62 | 0.69 |
| Granular Settled Bulk Density, lb/ft$^3$ | 34.0 | 34.6 |
| Granular Average Particle Size, inches | 0.043 | 0.029 |
| Granular Fines, wt % | 0.18 | 0.79 |
| Granular Melt Flow Index & Density | | |
| Granular Melt Flow Index $MFI_5$, dg/min | | 0.09 |
| Granular Melt Flow Index $MFI_{21}$, dg/min | 2.91 | 3.02 |
| Granular Melt Flow Ratio $I_{21}/I_5$ | | 34.0 |
| Granular Resin Density, g/cc | 0.9549 | 0.9550 |
| Extruded Melt Flow Index | | |
| Extruded Melt Flow Index $MFI_{21}$, dg/min | 2.66 | 2.59 |
| Extruded Melt Flow Ratio $I_{21}/I_5$ | | 40.7 |
| Resin Morphology | | |
| Settled Bulk Density, lb/ft$^3$ | 34.0 | 34.6 |
| Settled Bulk Density, Kg/m$^3$ | 545 | 554 |
| Sieve Size Analysis | | |
| On 10 Mesh >2 mm, wt % | 5.17 | 0.37 |
| On 18 Mesh 1~2 mm, wt % | 44.33 | 22.59 |
| On 35 Mesh 0.5~1.0 mm, wt % | 38.54 | 41.21 |
| On 60 Mesh 0.25~0.50 mm, wt % | 10.68 | 27.91 |
| On 120 Mesh 0.125~0.250 mm, wt % | 1.11 | 7.13 |
| On 200 Mesh 0.075~0.125 mm, wt % | 0.13 | 0.59 |
| Pan <0.075 mm, wt % | 0.05 | 0.20 |
| Average Particle Size, inches | 0.043 | 0.029 |
| Average Particle Size, mm | 1.09 | 0.73 |
| Fines thru 120 Mesh <0.125 mm, wt % | 0.18 | 0.79 |
| Fines thru 200 Mesh <0.075 mm, wt % | 0.05 | 0.20 |
| Cumulative Particle Diameter | | |
| 0.037 mm, wt % | 0.048 | 0.197 |
| 0.096 mm, wt % | 0.182 | 0.791 |
| 0.176 mm, wt % | 1.291 | 7.924 |
| 0.353 mm, wt % | 11.969 | 35.834 |
| 0.708 mm, wt % | 50.505 | 77.041 |
| 1.414 mm, wt % | 94.830 | 99.628 |
| 2.823 mm, wt % | 99.999 | 99.999 |
| 10.00 wt % Particle Diameter $D_{10}$, mm | 0.33 | 0.20 |
| 15.87 wt % Particle Diameter $D_{15.87}$, mm | 0.40 | 0.23 |
| 50.00 wt % Particle Diameter $D_{50}$, mm | 0.70 | 0.45 |
| 84.13 wt % Particle Diameter $D_{84.13}$, mm | 1.11 | 0.82 |
| 90.00 wt % Particle Diameter $D_{90}$, mm | 1.25 | 0.91 |
| Geometric Std Dev: $\sigma_g = D_{84.13}/D_{50} = D_{50}/D_{15.87}$ | 1.48 | 1.55 |
| Span = $D_{90} - D_{10}$, mm | 0.92 | 0.71 |
| Polydispersity = $(D_{90} - D_{10})/D_{50}$ | 1.31 | 1.58 |
| Resin Void Volume | | |
| Intraparticle Void Volume, cc/g | 0.182 | 0.196 |
| Interparticle Void Volume, cc/g | 0.559 | 0.538 |
| Total Resin Void Volume, cc/g | 0.741 | 0.735 |
| Intraparticle Porosity, volume fraction | 0.105 | 0.112 |
| Interparticle Porosity, volume fraction | 0.324 | 0.307 |
| Total Resin Porosity, volume fraction | 0.429 | 0.420 |
| Intraparticle/Interparticle Porosity Ratio | 0.326 | 0.364 |

TABLE 7-continued

| | Ex. 12 | Ex. 13 |
|---|---|---|
| MWD (GPC) | | |
| Mn | 26,000 | 11,970 |
| Mw | 226,500 | 330,300 |
| Mz | 1,402,000 | 3,590,000 |
| Mw/Mn | 8.71 | 27.59 |
| Mz/Mw | 6.19 | 10.87 |
| Polymer Structure - Unsaturation | | |
| Vinyls/1000 Carbons | 0.531 | 1.016 |
| Vinyls/Polymer Chain | 0.99 | 0.87 |

Test Methods

Test methods include the following:

Particle size distribution of the resin particles was measured using ASTM D1921—06e1 Test Method A.

Appearance of the resin particles was examined by optical microscopy.

Resin density was measured according to ASTM D-792.

Melt indices were measured in accordance with ASTM D-1238-04, Condition 190° C./2.16 kg, Condition 190° C./5 kg and Condition 190° C./21.6 kg, which are known as $I_2$, $I_5$ and $I_{21}$, respectively.

Polyethylene (Solid) Density (ρPE) is measured according to ASTM D792-08 Test Method A, Standard Test Methods for Density and Specific Gravity (Relative Density) of Plastics by Displacement (of water). Granular Resin Settled Bulk Density (SBDPE) is measured using ASTM D1895—96(2010)e1 Test Method A (pour funnel method), Standard Test Methods for Apparent Density, Bulk Factor, and Pourability of Plastic Materials.

Settled bulk density was measured by gently pouring the polymer resin into a stainless standard cylinder and determining the weight of the resin for the given volume of the filled cylinder.

Tensile Stress @ Yield and Elongation @ Break are measured according to ASTM D638-10, "Standard Test Method for Tensile Properties of Plastics."

The present invention may be embodied in other forms without departing from the spirit and the essential attributes thereof, and, accordingly, reference should be made to the appended claims, rather than to the foregoing specification, as indicating the scope of the invention.

We claim:

1. A polyethylene composition comprising: a granular polyethylene resin characterized by a resin solid density of from 0.956 to 0.960 g/cm$^3$, a granular resin settled bulk density ($SBD_{PE}$) of from 435 kg/m$^3$ to 495 kg/m$^3$, a $M_w/M_n$ in the range of from 9.74 to 10.45, a ratio of intraparticle porosity of from 0.33 to 0.67, and a total resin porosity, $\Phi_{total}$, of equal to or greater than 0.45.

2. The polyethylene composition according to claim 1, wherein the granular polyethylene resin is a high molecular weight resin characterized by a melt index, $I_{21}$, of from 2 to 4 dg/min and a ratio $I_{21}/I_5$ of from 20 to 40.

3. The polyethylene composition according to claim 1, wherein the granular polyethylene resin is further characterized by a resin particle size distribution polydispersity of from 0.6 to 1.2.

4. The polyethylene composition according to claim 1, wherein the granular polyethylene resin is further characterized by a resin average particle size ($APS_{PE}$) of from 0.7 mm to 1.2 mm.

5. The polyethylene composition according to claim 1, wherein the granular polyethylene resin is further characterized by a mass median diameter ($D50_{PE}$) of from 0.45 mm to 0.85 mm.

6. The polyethylene composition according to claim 1, wherein the granular polyethylene resin is further characterized by a granular resin total void volume ($v_{total}$) of equal to or greater than 0.9 cm$^3$/g.

7. The polyethylene composition according to claim 1, wherein the granular polyethylene resin is further characterized by the ability to absorb equal to or greater than 45% by volume butanol based on the volume of the granular polyethylene resin.

8. The polyethylene composition according to claim 1, wherein the granular polyethylene resin is produced by a particle forming polymerization process utilizing a spray-dried Cr-based catalyst.

9. The polyethylene composition according to claim 8, wherein the spray-dried Cr-based catalyst has a Cr content of equal to or greater than 0.1% by weight and equal to or lesser than 0.25% by weight.

10. The polyethylene composition according to claim 8, wherein the spray-dried Cr-based catalyst has a mass median diameter ($D50_{CAT}$) of from 45 μm to 65 μm.

11. The polyethylene composition according to claim 1, wherein the polyethylene resin is produced using a gas phase polymerization process utilizing a chromium oxide catalyst comprising a spray-dried silica support and equal to or greater than 0.1 wt % chromium, wherein the polymerization process comprises oxygen add back and with a steady-state residence time of less than 9 hours.

12. An article comprising the polyethylene composition according to claim 1 crosslinked with one or more absorbable crosslinking agents selected from the group consisting of peroxides, azides, and silanes.

13. The article according to claim 12, wherein the article is a pipe.

14. The article according to claim 12, wherein the article is selected from the group consisting of surfactants, pigments, pipe liners, plumbing appurtenances and wire and cable applications.

* * * * *